United States Patent [19]

Burkhardt

[11] 4,263,803
[45] Apr. 28, 1981

[54] CALIBRATION SYSTEM AND METHOD OF USING SAME

[75] Inventor: Allan D. Burkhardt, Berne, Ind.

[73] Assignee: Ex-Cell-O Corporation, Troy, Mich.

[21] Appl. No.: 36,264

[22] Filed: May 4, 1979

Related U.S. Application Data

[63] Continuation-in-part of Ser. No. 904,357, May 9, 1978, abandoned.

[51] Int. Cl.³ .............................................. G01C 25/00
[52] U.S. Cl. ........................................ 73/1 R; 73/1 J
[58] Field of Search ................ 73/1 R, 1 J; 33/174 L, 33/174 PC; 209/601, 604, 605; 324/75, 130

[56] References Cited

U.S. PATENT DOCUMENTS

| | | | |
|---|---|---|---|
| 3,416,658 | 12/1968 | Goller et al. | 33/174 L X |
| 3,454,880 | 7/1969 | Ries et al. | 324/130 |
| 3,795,054 | 3/1974 | Kinney | 33/174 PC |

*Primary Examiner*—Charles A. Ruehl
*Attorney, Agent, or Firm*—Reising, Ethington, Barnard, Perry & Brooks

[57] ABSTRACT

A calibration system for automatically and sequentially calibrating a plurality of electrical measuring systems of a gauging machine is provided. Each measuring system is of the type having a gain circuit, a zero circuit and a combination circuit connected to the preamplifier of a transducer and the zero circuit for combining the output signals of the preamplifier and zero circuits to obtain unamplified compensated electrical input signals which are amplified by the gain circuits and indicated on an indicator. Each of the measuring systems produces an electrical measurement in a predetermined range defined by upper and lower bounds equal in magnitude but opposite in polarity. The calibration system includes a plurality of negative voltage references and a plurality of positive voltage references corresponding to the lower and upper bounds, respectively. The transducers are first moved to the negative voltage references by a servo system to obtain a plurality of first input signals which are sequentially compared under control of a sequence controller and a multiplexer to a fixed reference signal corresponding to the lower bound by a window comparator. The transducers are then moved to the positive voltage references to obtain a plurality of second input signals. The second input signals are processed, the processed signals being sequentially compared to a fixed reference signal corresponding to the upper bound.

22 Claims, 11 Drawing Figures

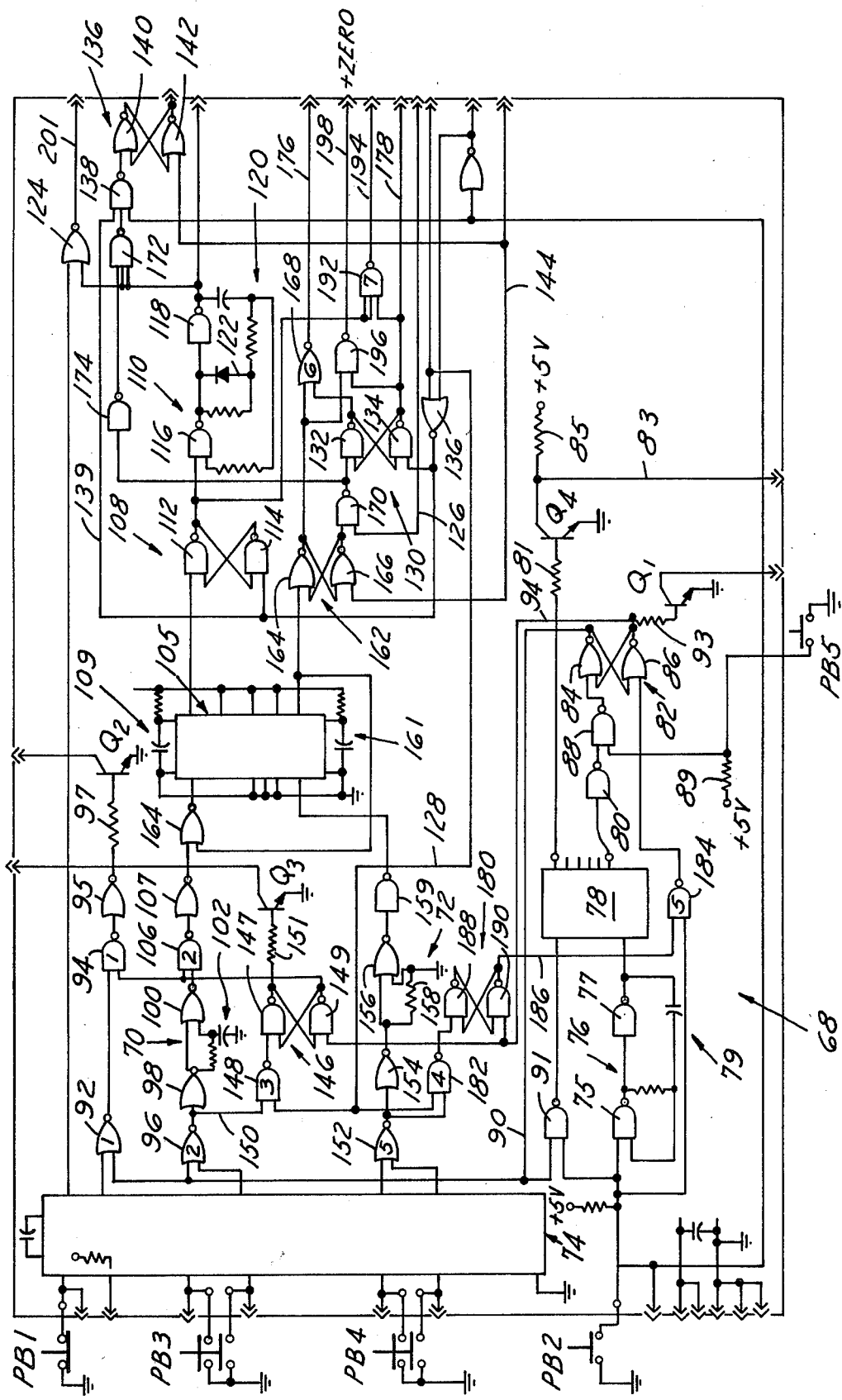

CALIBRATION SYSTEM AND METHOD OF USING SAME

This is a continuation-in-part application of U.S. Ser. No. 904,357, filed May 9, 1978, now abandoned.

TECHNICAL FIELD

This invention relates to calibration systems for calibrating electrical measuring systems and in particular to calibration systems for calibrating zero circuits and gain circuits of electrical measuring systems.

BACKGROUND ART

In many presently available electrical or electronic measuring systems it is necessary to manually calibrate the system for voltage offsets in the transducers and in the electronics. Furthermore, it is necessary to manually calibrate the systems for gain due to environmental conditions such as temperature which have an effect on the circuit elements of the measuring system. Typically, this is the time-consuming job and the accuracy of the calibration process depends upon the operator. These problems are further magnified when many measuring systems are to be calibrated at the same time. One calibration method includes balancing a high impedance difference amplifier wherein the operator observes a meter and adjusts the bounds until the meter nulls. Other inaccuracies introduced into the measuring system include drift and changes in reference voltage.

U.S. patents to Berry, U.S. Pat. No. 2,734,949, Schramm, U.S. Pat. No. 2,767,375, Cole et al, U.S. Pat. No. 2,919,401 and Senour U.S. Pat. No. 3,667,041 all disclose automatic calibration systems or circuits. The automatic calibration systems calibrate unipolar measuring devices, that is, measuring devices which measure and output a voltage between zero volts and a predetermined number of volts.

U.S. patent to Petersen et al U.S. Pat. No. 3,934,197 discloses an automatic calibration system for ph meters including a digital counter and a digital to analog converter which produces an output voltage connected to a difference amplifier to compensate the zero offset D.C. voltage of the ph measurement system. The automatic calibration system is applicable to unipolar measuring devices.

U.S. patent to Ries et al, U.S. Pat. No. 3,454,880 discloses a transformation system for periodic compensation of inaccuracy arising from sensor instability. A measuring device measures preselected reference quantities which are compared with preset electrical reference signals whereby difference voltages derived from the comparison are used to control adjusting means which adjust the transformation characteristics of the system including the zero point and the reference voltage which corresponds to the end of the measuring range.

Other calibrating circuits generally of the type to which this invention relates are disclosed by the U.S. patents of Sprong U.S. Pat. No. 1,090,419, Kuckein, U.S. Pat. No. 3,633,202, Allington et al U.S. Pat. No. 3,667,056, MacKnight et al U.S. Pat. No. 2,787,418, Bell U.S. Pat. No. 2,874,354, Alexander et al U.S. Pat. No. 2,897,486, Ullrich U.S. Pat. No. 3,181,063, Goransson, U.S. Pat. No. 3,535,637 and Petrohilos U.S. Pat. No. 3,665,305.

DISCLOSURE OF THE INVENTION

An object of the present invention is to provide a calibration system for an electrical measuring system of the type having a gain circuit, a zero circuit and a combination circuit, to obtain compensated electrical input signals, the calibration system calibrating the measuring system to produce electrical measurements corresponding to upper and lower bounds of opposite polarity defining a predetermined range and wherein the uncalibrated measuring system provides first and second electrical input signals of opposite polarity upon measuring first and second references corresponding to the lower and upper bounds of the predetermined range of the measuring system.

Another object of this invention is to provide a calibration system for automatically calibrating an electrical measuring system of a gauging machine, the measuring system being of the type having a gain circuit, a zero circuit and combination circuit to obtain compensated electrical input signals wherein drive means of the gauging machine positions the measuring device and a first reference means in operative relationship to obtain a first input signal and positions a second reference means and the measuring device in operative relationship to obtain a second input signal and wherein a control means controls the drive means and is responsive to signals from the gauging machine indicating the operative relationships to control the calibration process which includes the processing of the first and second input signals.

A further object of the invention is to provide a calibration system for automatically calibrating a plurality of electrical measuring systems of a gauging machine in sequence, each measuring system of the type having a gain circuit, a zero circuit and combination circuit to obtain compensated electrical input signals wherein scanning means scan the measuring systems to allow a control means to sequentially control the calibration process of each electrical measuring system and wherein calibrating means sequentially adjust the zero circuits and the gain circuits such that the electrical measuring systems output compensated input signals corresponding to the lower and upper bounds in response to a plurality of first and second input signals obtained by measuring first and second reference means corresponding to the lower and upper bounds, respectively.

In carrying out the above objects and other objects of this invention a preferred embodiment of the invention includes first and second reference means for providing first and second references corresponding to the lower and upper bounds, respectively, of the predetermined range of the measuring system when calibrated. The uncalibrated measuring system provides first and second electrical input signals of opposite polarity by measuring the first and second references, respectively. Third reference means provide reference signals. Comparator means compares reference signals to corresponding compensated input signals and outputs corresponding adjustment signals corresponding to the difference therebetween. Zero adjustment means adjusts the zero circuit in response to a first adjustment signal wherein the electrical measuring system outputs a compensated input signal corresponding to the lower bound. Gain adjustment means adjusts the gain circuit in response to a second adjustment signal wherein the electrical measuring system outputs a compensated input signal corresponding to the upper bound.

The objects, features and advantages of the present invention are readily apparent from the following detailed description of the best mode taken in connection with the accompanying drawings.

BRIEF DESCRIPTION OF DRAWINGS

FIG. 7 is a partial schematic, partial electrical circuit diagram showing the electrical components of the sequence controller of FIG. 3 in greater detail;

BEST MODE FOR CARRYING OUT THE INVENTION

Figure 1:
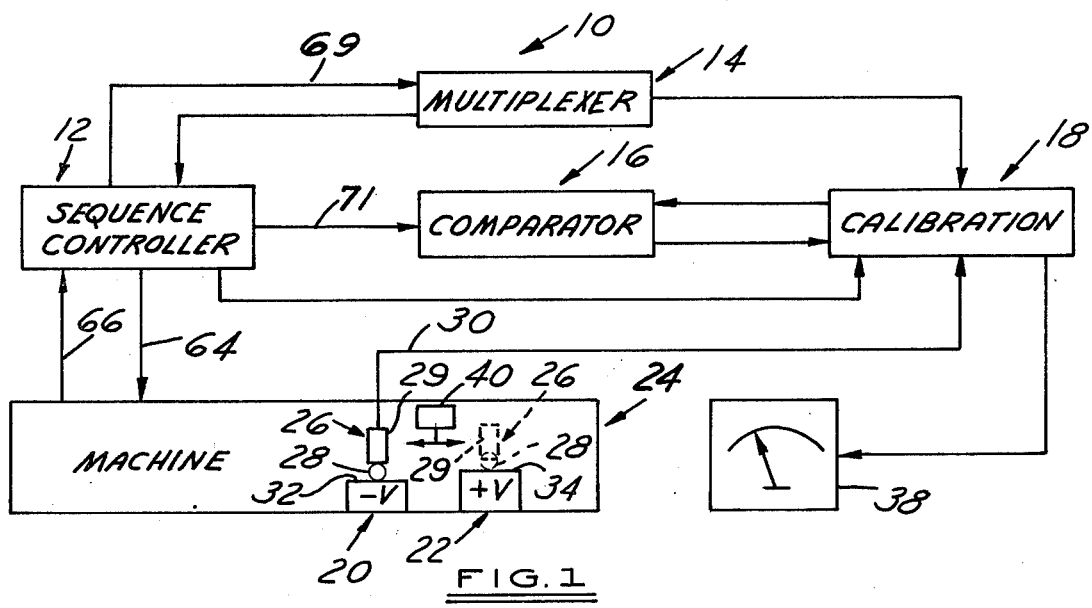
FIG. 1 is a schematic view of a calibration system constructed according to this invention and the flow of signals within the system and with a gauging machine whose electrical measuring systems are to be calibrated.

Referring to FIG. 1, a calibration system constructed according to the present invention is indicated collectively by reference numeral 10 and includes a sequence controller, generally indicated at 12; a multiplexer, generally indicated at 14; a comparator, generally indicated at 16; a plurality of calibration circuits, generally indicated at 18; and a first and second reference means or a like plurality of negative voltage references exemplified by a reference generally indicated at 20 and a like plurality of positive voltage references exemplified by a reference generally indicated at 22. The voltage references comprise metal blocks having a known physical size (i.e. gauge blocks).

The calibration system 10 automatically calibrates a plurality of identical electrical measuring systems (only one of which is shown in detail in FIGS. 1 through 9) of a gauging machine, generally indicated at 24. Each electrical measuring system is of the type having a measuring device or a gauge transducer generally indicated at 26. The transducer 26 has a spring loaded metal ball tip 28 which enables the transducer 26 to output a varying electrical input signal along a lead line 30 in a convenient fashion when the ball tip 28 is pressed against a surface such as the outer surfaces 32 and 34 of the negative voltage reference 20 and positive voltage reference 22, respectively.

The measuring system further includes a preamplifier 36 for amplifying the input signals from the transducer 26. After amplification by the pre-amplifier 36 the input signals vary from negative 5 volts to positive 5 volts which are the respective lower and upper bounds of the range of the measuring system. When the electrical measuring system is calibrated, which process will be described in greater detail hereinafter, an indicator 38 of the measuring system will indicate negative 5 volts when the transducer 26 engages the negative voltage reference 20 and positive 5 volts when the transducer 26 engages the positive voltage reference 22. A drive means or a servo system 40, as shown in FIG. 1, of the gauging machine 24 moves the transducer 26 laterally as shown in FIG. 1 while maintaining the same vertical distance, or, in other words, the servo system 40 does not move the transducer 26 vertically, but rather, allows the tip 28 to move within the body 29 of the transducer 26 when encountering one of the references 20 or 22.

Figure 5:
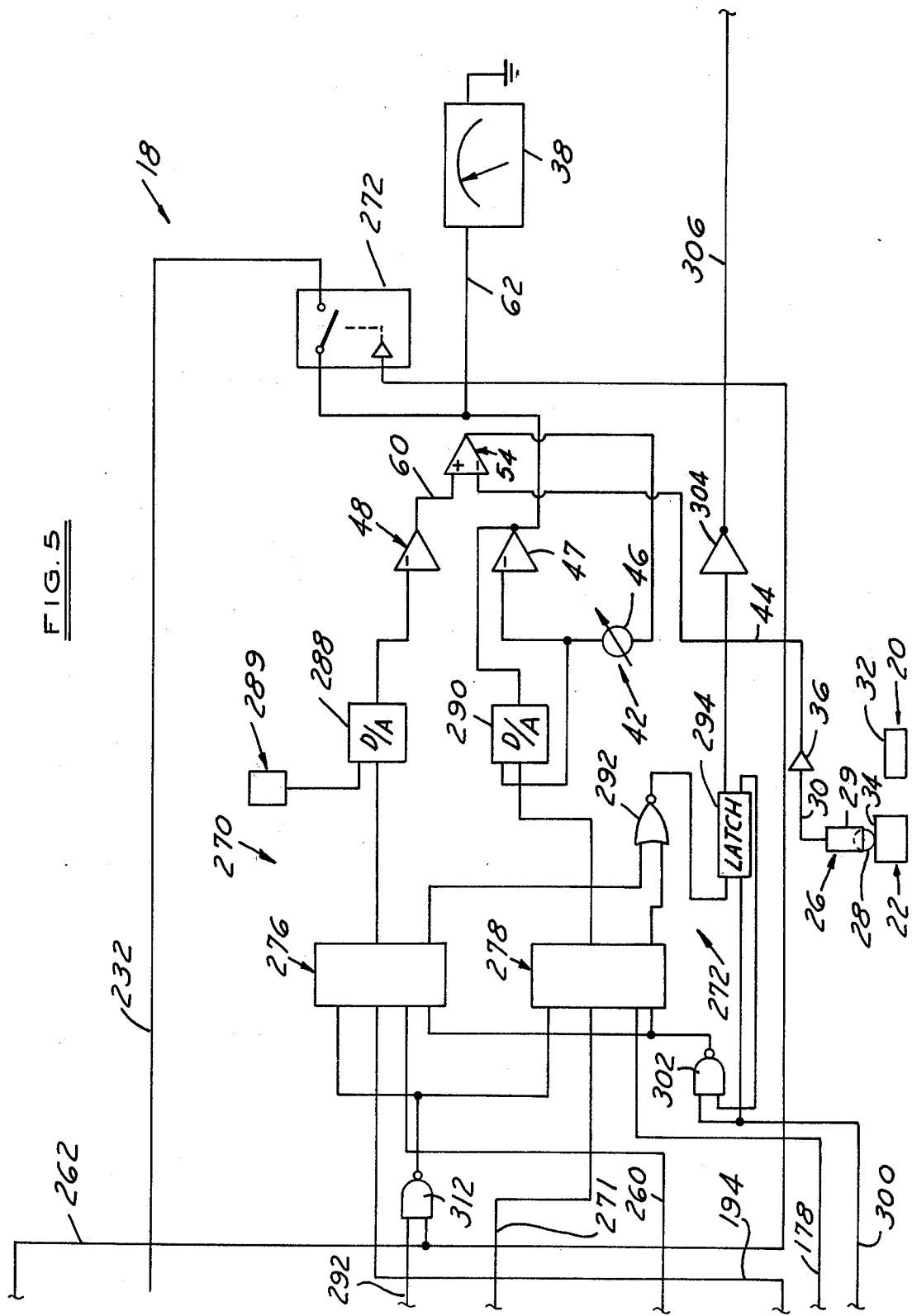
FIG. 5 is a detailed schematic view showing in detail one calibration circuit of the calibration block of FIG. 1 and one measuring system and the interconnections therebetween.
Figure 9:
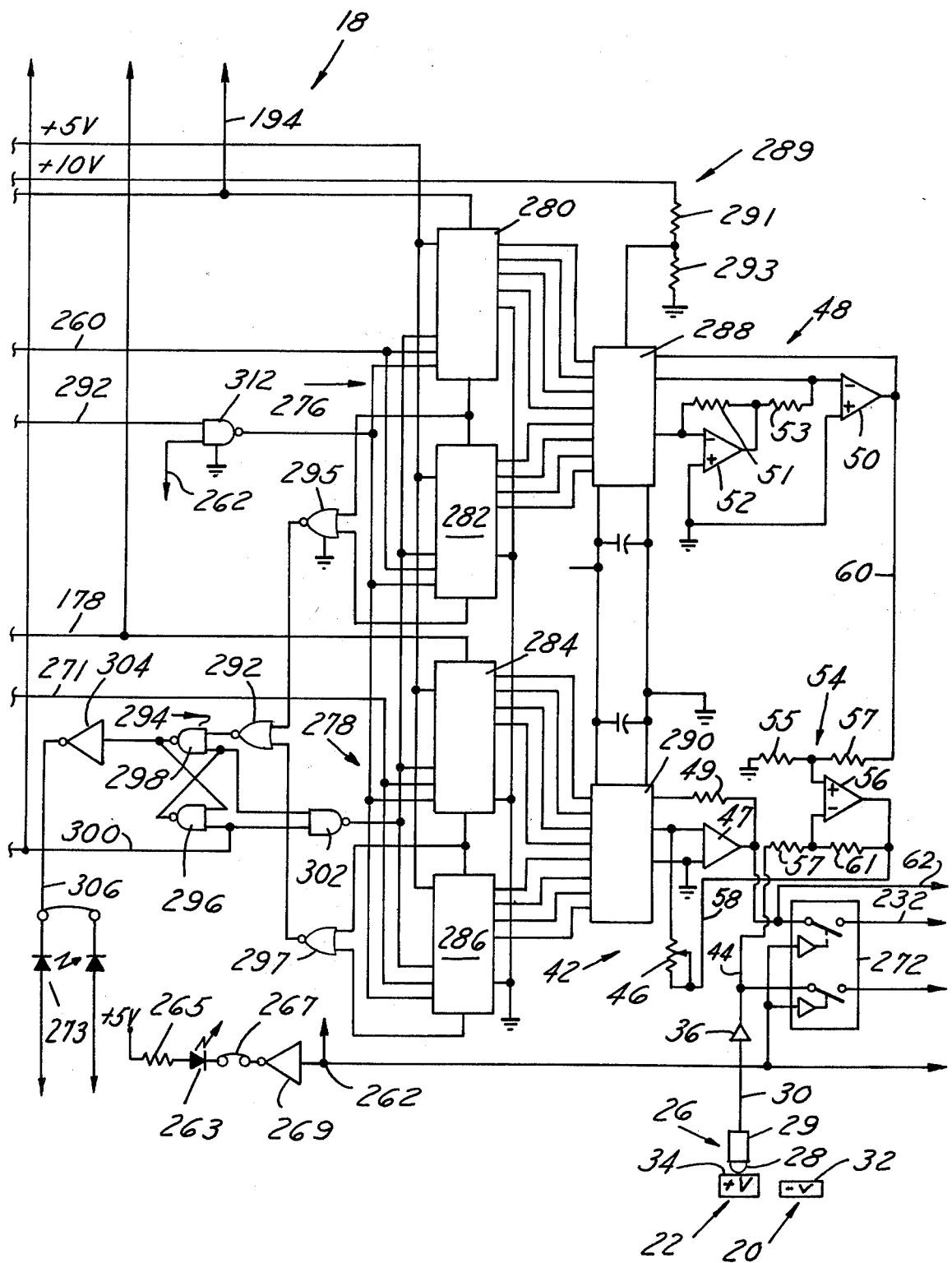
FIG. 9 is a partial schematic, partial electrical circuit diagram showing in greater detail the calibration circuit 40 as shown in FIG. 5.

Each measuring system further includes a zero circuit 48 which includes a pair of coupled gain amplifiers 50 and 52, and feedback resistors 51 and 53, as shown in FIG. 9, and which for simplicity as a single gain amplifier 48 in FIG. 5. The measuring system also includes a combination circuit or a subtraction circuit, generally indicated at 54 in FIGS. 2, 5 and 9. The subtraction circuit 54 as shown in FIG. 9 includes associated biasing resistors 55, 57, 59 and 61, and an analog difference comparator 56. The subtraction circuit 54 subtracts the bipolar analog signal from preamplifier 36 along the lead line 44 from a zero signal from the zero circuit 48 appearing on lead line 60. Signals appearing on lead line 62 are defined as compensated electrical input signals to be distinguished from input signals appearing on lead line 44.

Each measuring system also includes a gain circuit 42 which accepts the signal from the subtraction circuit 54 to obtain compensated electrical input signals output on lead line 62 to the bipolar indicator 38. The gain circuit 42 includes a gain spread adjustment variable resistor 46, as shown in FIGS. 5 and 9 for adjusting the spread of gain of the gain circuit 42. The resistor 46 is adjusted when the calibration circuits are reset such that the voltage level in lead line 44 equals the voltage level indicated by the indictor 38. As shown in FIGS. 5 and 9, the gain circuit 42 further includes a biasing resistor 49 and a gain amplifier 47 which accepts the input signal from the variable resistor 46 at its negative input.

Figure 3:
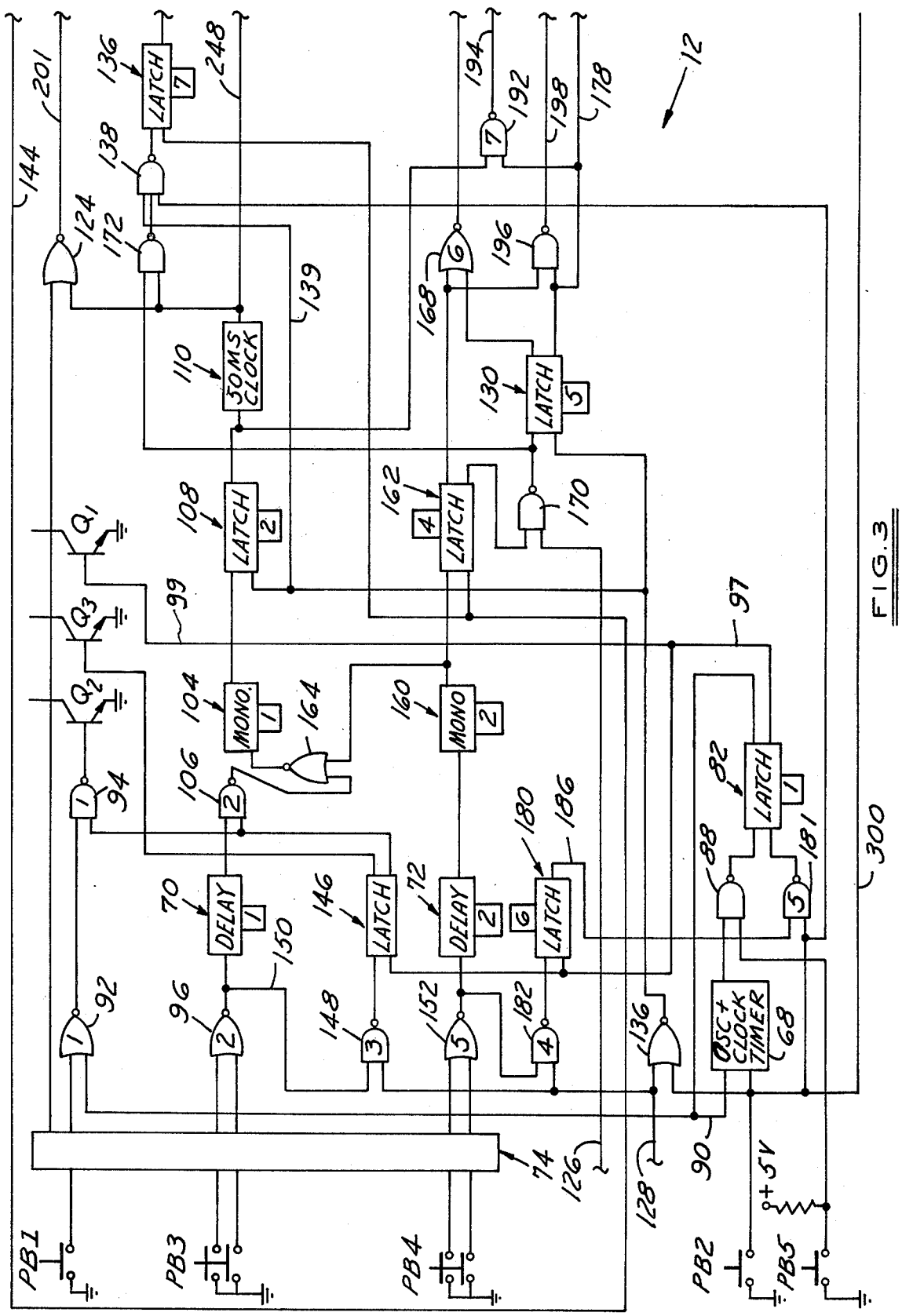
FIG. 3 is a detailed schematic view of the sequence controller of FIG. 1 and showing the interface between the gauging machine and the sequence controller.
Figure 4:
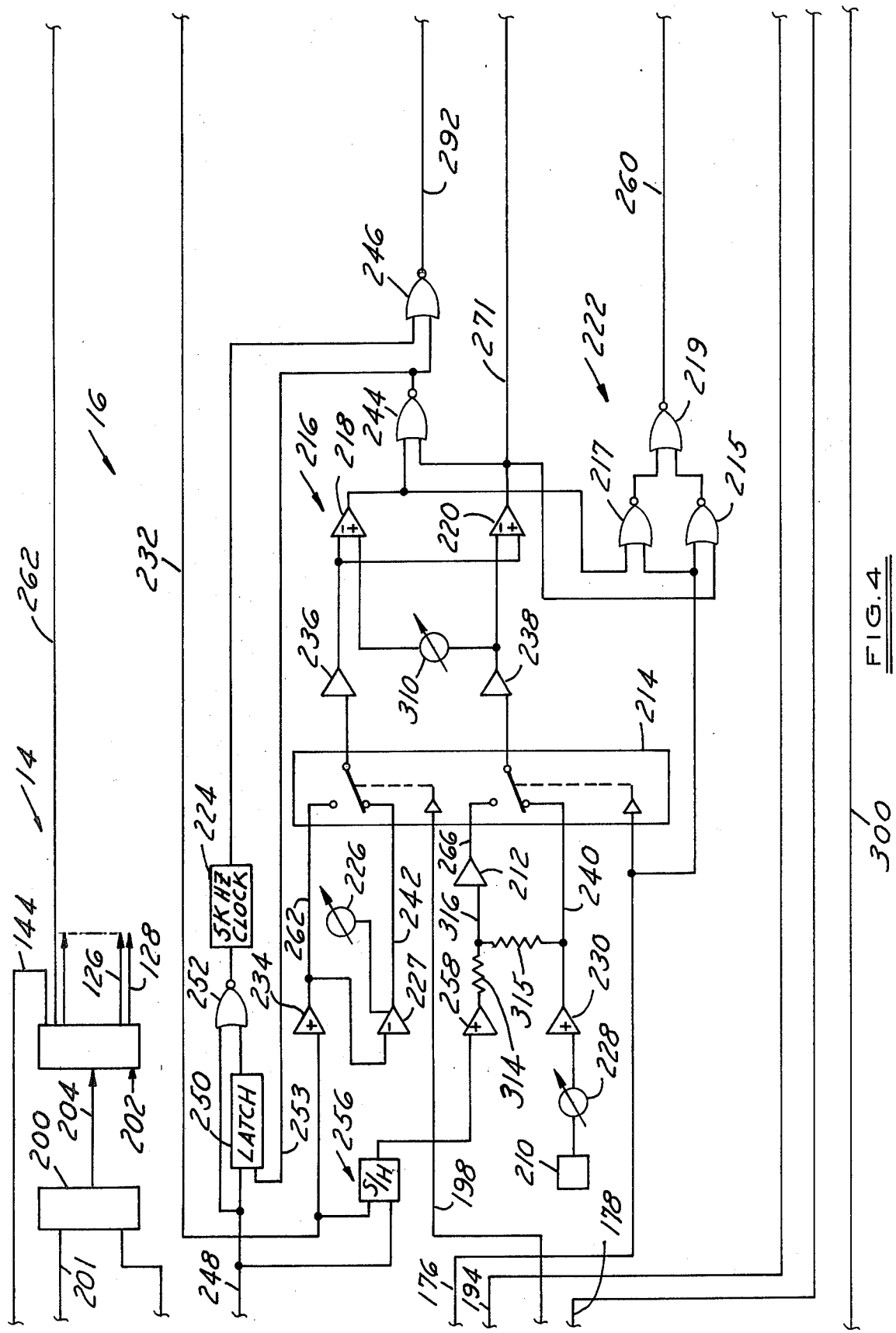
FIG. 4 is a detailed schematic view of the multiplexer and comparator of FIG. 1.
Figure 8A:
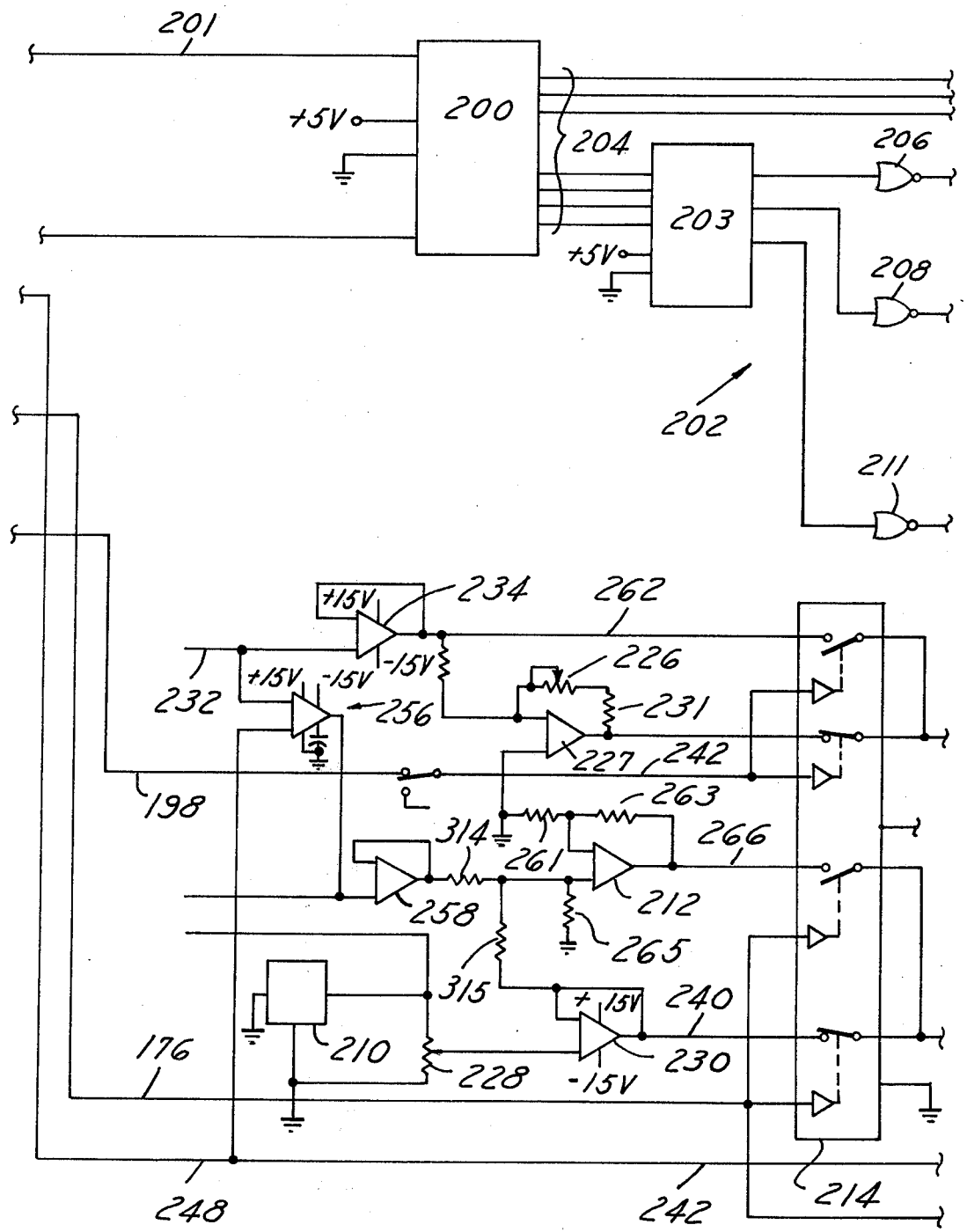
FIG. 8a is a partial schematic, partial electrical circuit diagram showing in greater detail one-half of the multiplexer and the comparator shown in FIG. 4.
Figure 8B:
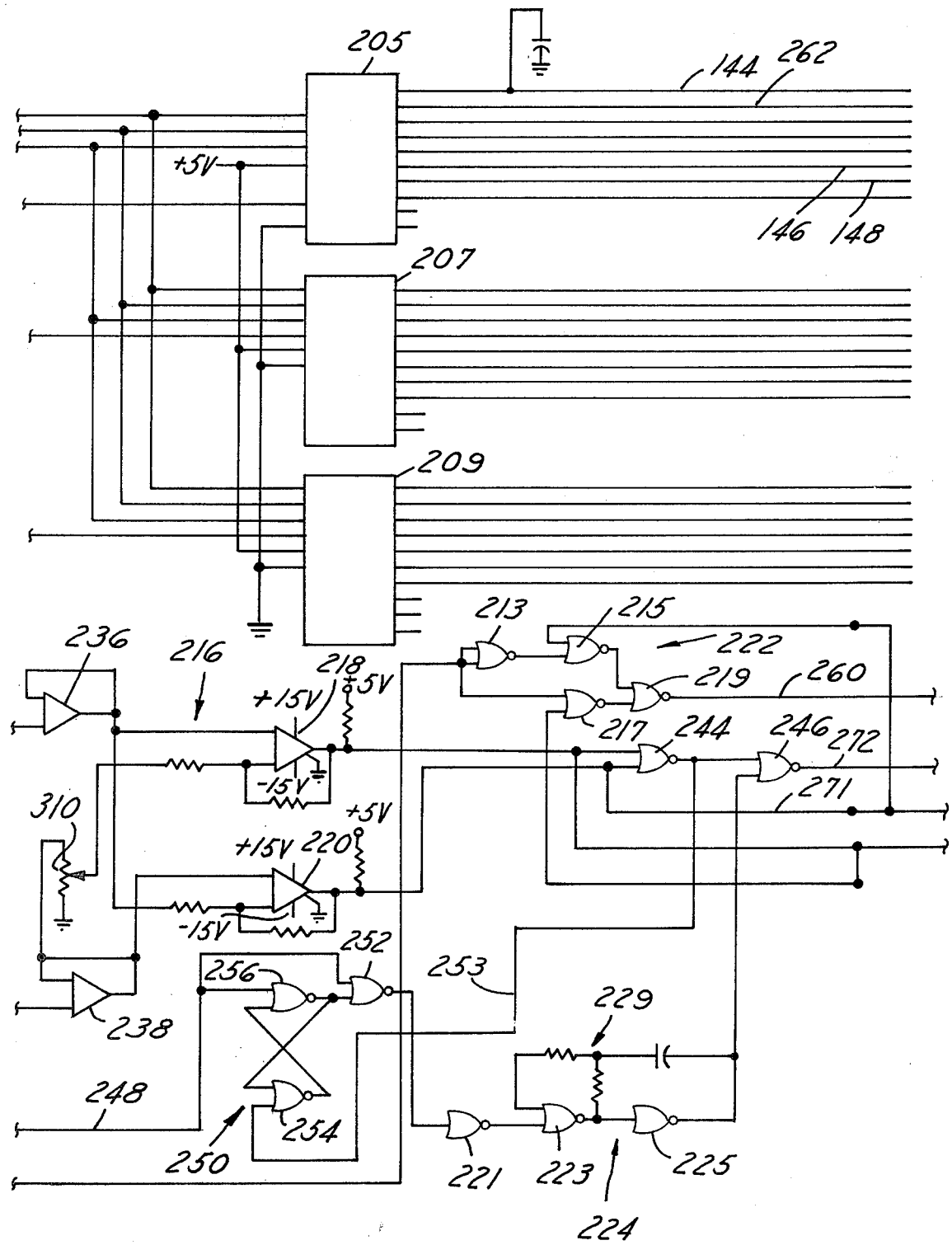
FIG. 8b is a partial schematic, partial electrical circuit diagram showing in greater detail the second half of the multiplexer and the comparator of FIG. 4.

It should be noted at this time that FIG. 3 corresponds to FIG. 7, FIG. 4 corresponds to FIGS. 8a and 8b, and FIG. 5 corresponds to FIG. 9. FIGS. 7 through 9 merely show in greater detail the various circuit elements and their interconnections are included for completeness.

One sequence controller 12, one multiplexer 14 and one comparator 16 are used to calibrate twenty (20) electrical measuring systems, as schematically shown in FIG. 1. The time needed for the calibration system to automatically calibrate a particular electrical measuring system is approximately 50 milliseconds for the negative voltage reference 20 and 100 milliseconds for the positive voltge reference 22. Therefore, a gauging machine 24 having 20 electrical measuring systems will take approximately 3 seconds to calibrate, not including the time required to move each of the transducers in synchronism between its negative voltage reference 20 and its positive voltage reference 22.

GENERAL DESCRIPTION OF THE CALIBRATION SYSTEM

In general, the calibration system works in a closed loop with the transducers. The outputs of the sequence controller 12 appear on a bus 64. These output signals include the following:
1. clock times out;
2. after finishing present machine cycle, wait for further instructions;
3. move the transducers to their negative voltage references;
4. move the transducers to their positive voltage references;
5. overflow (i.e. a particular measuring system or systems cannot be calibrated).

The input to the sequence controller 12 from the gauging machine 24 appears on a bus 66. These inputs include the following:
1. gauging machine in position to be calibrated as indicated by a switch such as a push button, PB1 in FIG. 3;
2. reset the sequence controller 12 as indicated by a switch such as a push button, PB2;
3. the transducers are at the negative voltage references as indicated by a switch such as a push button, PB3; and
4. the transducers are at the positive voltage references as indicated by a switch such as a push button, PB4.

It should be noted that all of the push buttons, PB1-4, are automatically switched by the gauging machine 24. However by disconnecting the push buttons PB1-4 from the gauging machine 24, the push buttons PB1-4 can be manually switched to provide the necessary control and feedback signals to the sequence controller 12.

A preset clock-timer generally indicated at 68 of the controller 12 includes an oscillator circuitry generally indicated at 76 in FIG. 7. When the timer 68 runs out it energizes a relay (not shown) in the gauging machine 24 through a transistor, Q1, whose relay prevents the gauging machine 24 from starting another cycle. When the last motion of the gauging machine 24 is completed, the switch PB1 is actuated to place the gauging machine 24 under the control of the sequence controller 12. The sequence controller 12 then energizes a second relay (also not shown) of the gauging machine 24 through a second transistor Q2, which causes the servo system 40 to move the transducers to the negative voltage references. When the transducers are located at the negative voltage references the switch, PB3 is actuated which causes the calibration system 10 to go through its negative zeroing routine for all the measuring systems after a time delay introduced by a delay circuit 70 of typically 0.5 seconds if air gauging is used and which can be as long as one or two seconds. The timed delay is necessary for the transducers to settle at the negative voltage references after being moved especially if air gauging is used.

After the calibration system 10 has completed the negative zeroing routine, the sequence controller 12 energizes a third relay (not shown) of the gauging machine 24 through a third transistor Q3 thereby instructing the servo system of the gauging machine 24 to move the transducers to the positive voltage references.

When the transducers are located at the positive voltage references, the switch PB4 is actuated which, after a time delay introduced by a second delay circuit 72 equal in duration as the first time delay, the calibration system 10 goes through an automatic one-half error positive zeroing routine for all the measuring systems. When this is completed the calibration system 10 goes through a gain adjusting routine for all the measuring systems. When the gain compensation is completed all of the internal control circuits are reset and the gauging machine 24 is released by the controller 12 to its normal cycle. The timer 68 restarts or starts timing again to prepare for another calibration cycle after it again times out.

The input interface (not shown) connects the rest of the gauging machine 24 to the sequence controller 12. The gauging machine 24 supplies power for the input side of the interface 74 which is optically isolated from the output side of the input interface by conventional isolators. The output side of the input interface is compatible with the logic of the sequence controller 12.

The controller 12 includes a plurality of debounce circuits generally indicated at 74.

SEQUENCE CONTROLLER

As previously noted, the sequence controller 12 outputs control signals along the bus 64 to the gauging machine 24 and receives signals from the gauging machine 24 along the bus 66 for feedback. The sequence controller 12 also outputs control signals to the multiplexer 14 and the comparator 16 along buses 69 and 71, respectively, to automatically calibrate the measuring systems. The sequence controller 12 will now be described in greater detail by reference to FIGS. 3 and 7.

As previously noted, the timer 68 includes the oscillator circuit 76 having a period of approximately two seconds. The oscillator circuit 76 includes a pair of NAND gates 75 and 77 and a coupled network generally indicated at 79. The oscillator circuit 76 drives the clock input of a 12 bit binary counter 78 of the timer 68. Depending on the time interval desired between calibrations, (i.e. the time between pulses outputted by the binary counter 78 to a driver-NAND gate 80 of the timer 68), different output bits of the counter 78 can be connected to the input of the NAND gate 80. In this case the time ranges from 7.5 minutes to 60 minutes.

Bit 1 of the counter 78 is connected to a transistor Qy through a resistor 81 to turn on an LED (not shown) along a line 83 connected to a pull-up resistor 85 every 2 seconds in the instant case to indicate that the timer 68 is timing.

When the timer 68 times out a latch 82 comprising a pair of conventional cross-coupled NOR gates 84 and 86, is set through a NAND gate 88. The latch can also be set by a push button PB5 with pull-up resistor 89 through the NAND gate 88 in order to manually override the timer 68.

Figure 2:
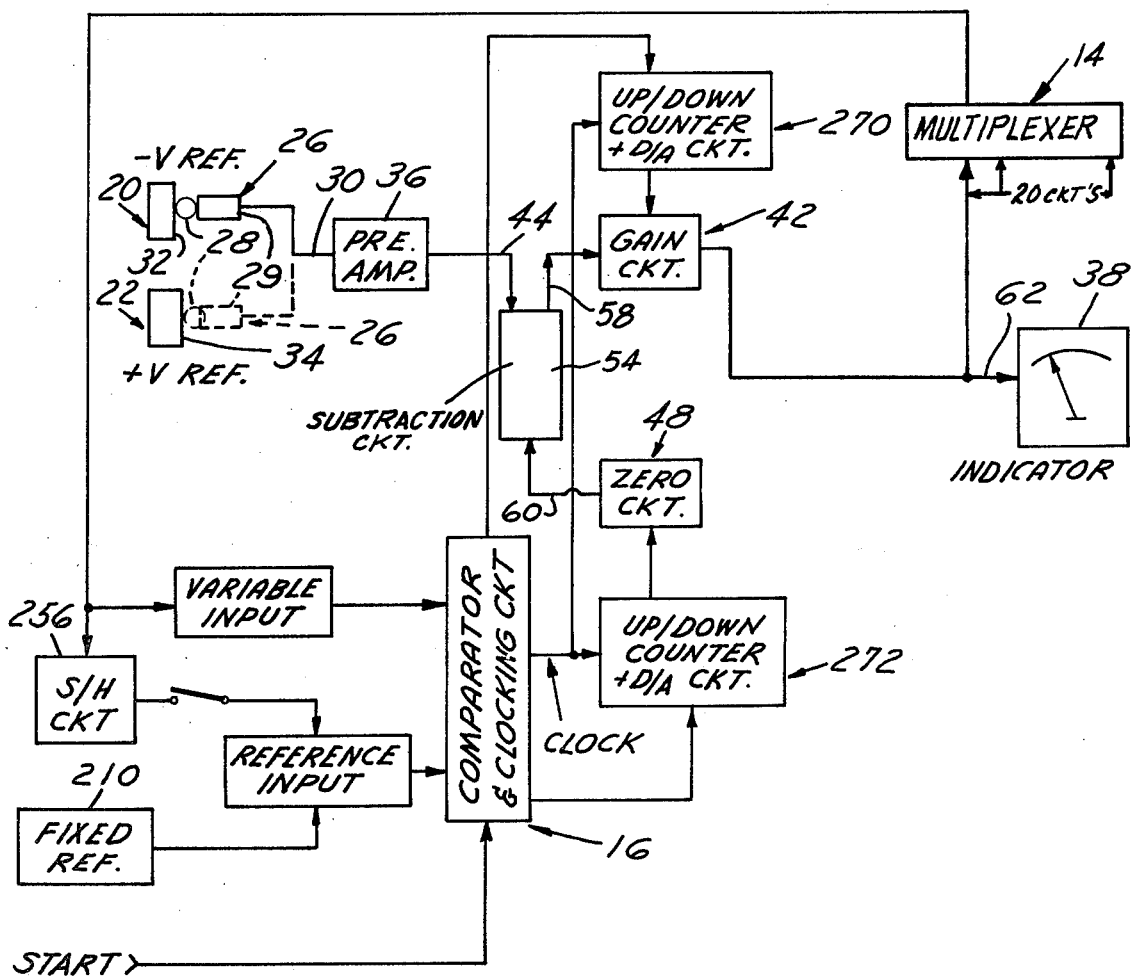
FIG. 2 is a schematic view showing the comparator and a calibration circuit of the calibration block in greater detail as well as showing one measuring system of the gauging machine of FIG. 1.

After the latch 82 is set, the latch 82 in turn resets the counter 78 along a lead line 90 through a NAND gate 91. It also removes an inhibit signal from a first NOR gate 92 and sends the signal via lead line 94 to the base of the transistor Q1 through a resistor 93 to signal the gauging machine 24 to stop at the end of the gauging or machine cycle. When the machine cycle of the gauging machine 24 stops a signal is returned to the sequence controller 12 through PB1 and the input interface 74 to the first NOR gate 92. The first NOR gate 92 switches Q2 on through a first NAND gate 94, a driver NOR gate 95 and a resistor 97 to control the servo system 40 of the gauging machine 24 to move the transducers to the negative voltage references. When the transducers engage the negative voltage references as illustrated in FIG. 2 by the solid lines, a feedback signal is returned through the input interface 74 via PB3 to a second NOR gate 96. The second NOR gate 96 activates the delay circuit 70 which comprises a pair of NOR gates 98 and 100, the inputs of the NOR gate 100 being connected by an RC network 102. As previously noted, the delay circuit 70 is provided to allow the transducers to settle at the negative voltage references. When the first delay circuit 70 times out, it activates a first mono-pulser circuit 104 as shown in FIG. 3 of a dual mono-pulser circuit 105, as shown in FIG. 7 through a second NAND gate 106, a driver NOR gate 107 and a NOR gate 164. A first mono-pulser circuit 104 includes an RC network 109 interconnected to provide a time constant of approximately 5 msec.

Figure 6A:
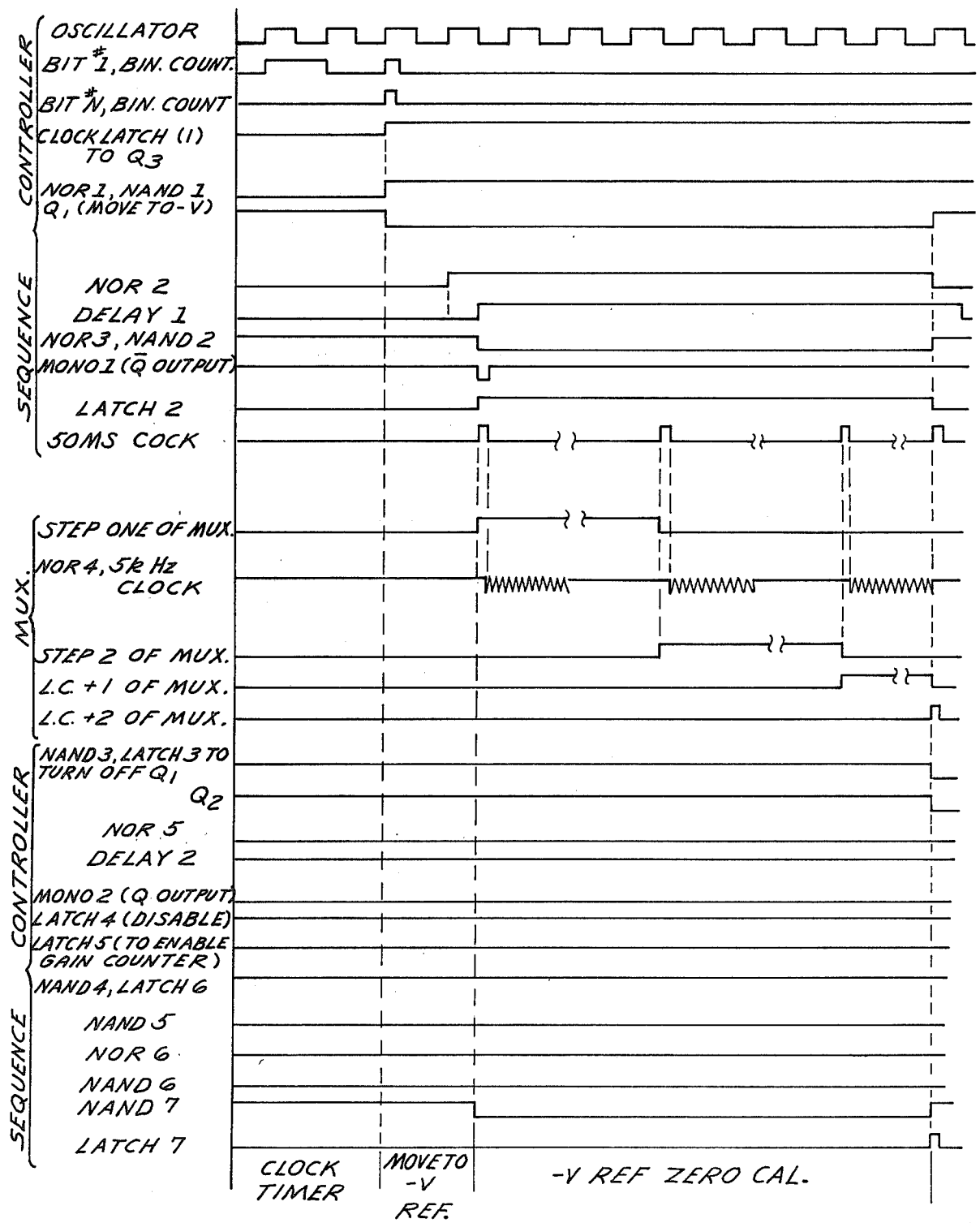
FIG. 6a is one-half the timing diagram of the sequence controller and the multiplexer of FIG. 1.
Figure 6B:
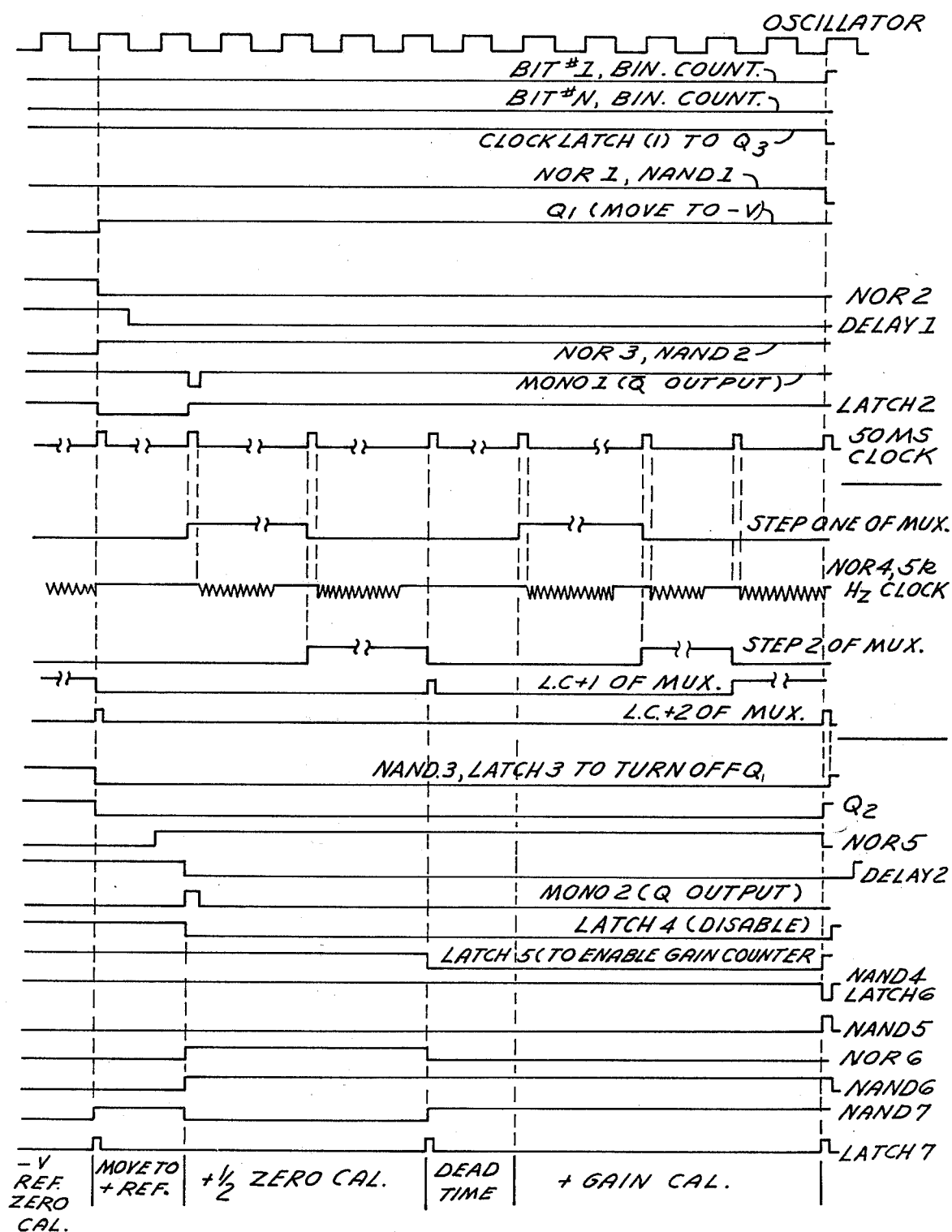
FIG. 6b is the second half of the timing diagram of the sequence controller and the multiplexer of FIG. 1.

The activated first mono-pulser circuit 104 sets a second latch 108 which in turn turns on a clock 110 having a period of 50 milliseconds and the timing diagram of which is shown in FIGS. 6a and 6b. The latch 108 includes a pair of cross-coupled NAND gates 112 and 114. The clock 110 includes a pair of coupled NAND gates 116 and 118, an RC network generally indicated at 120, and a diode 122. The clock 110 drives the multiplexer 14 through a NOR gate 124. After the multiplexer 14 has calibrated its last measuring system with reference to the negative voltage references the multiplexer 14 outputs a pair of signals LC+1 and LC+2 on a pair of lead lines 126 and 128, respectively. The LC+2 signal resets a fifth latch generally indicated at 130 comprising a pair of cross-coupled NAND gates 132 and 134 through a NOR gate 136. At the same time that the fifth latch 130 is reset the multiplexer 14 is reset through a seventh latch 136 and through a NAND gate 138 by a signal appearing on a lead line 139. The latch 136 includes a pair of cross-coupled NAND gates 140 and 142. The latch 136 is reset by a signal appearing on a lead line 144 when the multiplexer 14 reaches its home position.

A latch generally indicated at 146 and comprising a pair of cross-coupled NAND gates 147 and 149, is activated through a third NAND gate 148 through a lead line 150 from the second NOR gate 96. The latch 146 turns off the transistor Q2 through the first NAND gate 94 and turns on the transistor Q3 through a resistor 151 to move the transducers to the positive voltage references. As previously noted, the signal from the transistor Q3 (as well as the other transistors Q1 and Q2) signals the gauging machine 24 by means of a relay activated by Q3.

When the transducers engage the positive voltage references as illustrated in FIG. 2 by phantom lines, a feedback signal is returned through the input interface 74 via PB4 to a fifth NOR gate 152 which activates a second delay circuit generally indicated at 72 identical with the first delay circuit 70. The second delay circuit 72 includes a pair of coupled NOR gates 154 and 156 and an RC network 158 coupled between the inputs of the NOR gate 156. As previously noted, the delay provided by the second delay circuit 72 allows the transducers to settle at the positive voltage references. After the delay circuit 72 times out it activates through a driver NAND gate 159, a second mono-pulser circuit 160 as shown in FIG. 3 of the dual mono-pulser 105 as shown in FIG. 7. The second mono-pulser circuit 160 which includes an RC circuit 161 to set a time constant, trips a fourth latch 162 comprising a pair of cross-coupled NOR gates 164 and 166 and activates the first mono-pulser circuit 104 through a NOR gate 164 as shown in FIGS. 7 and 3. The fourth latch 162 puts a disable signal on a lead line 176 and puts an enable signal on a lead line 198 through a sixth NOR gate 168 and a NOR gate 196, respectively. At the same time, the second latch 108 is latched by the first mono-pulser circuit 104 which starts the clock 110 to drive the multiplexer 14 through the NOR gate 124. After the calibration of the last measuring system with reference to the positive voltage references the LC+1 signal again appears on line 126 to activate the fifth latch 130 through a NAND gate 170 which gate 170 also resets the multiplexer to home position 14 through the seventh latch 136, through the NAND gate 138, a NAND gate 172 and a driver NAND gate 174 as shown in FIG. 7. The multiplexer 14 in turn resets the fourth latch 162 along the line 144 on reaching its home position, which resetting inhibits the NAND gate 170 so that the multiplexer 14 is not reset thereafter by an LC+1 signal appearing on line 126. As shown in FIGS. 3 and 7, the seventh latch 136 is reset at the same time that the fourth latch 162 is reset. The fifth latch 130 puts a disable signal on the lead line 192 through the NOR gate 196 and puts an enable signal on the lead line 178.

The multiplexer 14 begins a new scan of the measuring systems since the second latch 108 and the clock 110 are still active. When the multiplexer 14 has stepped to its last position thereby outputting an LC+2 signal on the lead line 128 the NOR gate 136 resets the fifth latch 130, the second latch 108 and the multiplexer 14 by the latch 136 through the NAND gate 138.

The sixth latch 180 is set by a fourth NAND gate 182 by the LC+2 signal on the line 128. The sixth latch 180 resets the first latch 82 by a fifth NAND gate 184 along a line 186. The sixth latch 180 includes a pair of cross-coupled NAND gates 188 and 190. The first latch 82 inhibits the transistor Q1 along the lead line 94 and resets the latches 146 and 180 so a new calibration cycle will not start. At the same time, the timer 68 starts timing thereby preparing for a new calibration cycle. A seventh NAND gate 192 outputs a disenable signal along a lead line 194 when the latch 108 is reset by the LC+2 signal, A NAND gate 196 outputs a control signal along the line 198. While the controller 12 has been described with particularity, reference should be made to FIGS. 6a and 6b for a timing diagram of the controller 12 and the multiplexer 14 which will now be described in greater detail.

MULTIPLEXER

The multiplexer 14 scans the different measuring systems. After the calibration of one particular measuring system is completed the multiplexer 14 steps to the next measuring system. The multiplexer 14 includes a seven-bit binary counter 200 clocked by the 50 msec. clock 110 of the sequence controller 12 along a lead line 201. The binary counter 200 advances one count every 50 millisecond clock pulse. Four binary coded decimal (BCD) to decimal converters, generally indicated at 202 in FIG. 4 and by reference numbers 203, 205, 207 and 209 in FIGS. 8a and 8b, decode the binary number generated by the counter 200 onto a bus 204. The output of the converters 202 thereafter becomes the output of the multiplexer 14. As shown in FIGS. 8a and 8b the converter comprises four interconnected, integrated circuit chips interconnected by NOR gates 206, 208 and 211.

COMPARATOR

The comparator 16 includes a 10-volt voltage reference 210, an analog adder-subtractor 212, a quad analog switch 214, a window comparator generally indicated at 216, including a pair of differential comparators 218 and 220. The comparator 16 also includes a polarity detector generally indicated at 222 and a 5-kilohertz clock generally indicated at 224. The polarity detector 222 includes four interconnected NOR gates 215, 217 and 219 and a driver NOR gate 213 as shown in FIG. 8b. The clock 224 includes three interconnected NOR gates 221, 223 and 225 and an RC circuit, generally indicated at 229 to set the clock period. As shown in FIG. 8a, a feedback resistor 231 and a variable feedback resistor 226 sets a gain inverter 227 such that the voltage appearing on line 232 appears at the output of a buffer 236. The positive voltage reference is set by a variable resistor 228 in combination with the 10-volt reference 210 to obtain a positive 5 volts by varying the value of the resistor 228.

NEGATIVE VOLTAGE CALIBRATION

The first function of the comparator 216 is to control the measuring systems during negative voltage calibration. A compensated input signal of a measuring system selected by the multiplexer 14, for example via a lead line 262, appears on lead line 232 in the form of an output voltage. The output voltage goes through a buffer 234, an inverter 227, the switch 214, a second buffer 236 and to the amplifiers 218 and 220 of the window comparator 216. The fixed reference signal provided by the reference voltage 210 and a variable resistor 228 and the amplifier 230 are connected to the other side of the window comparator 216 through an amplifier 230, the switch 214 and a third buffer 238. The difference between the 5-volt fixed reference signal appearing on lead line 240 and the analog voltage appearing on lead line 242 determines whether the selected calibrating circuit will have to make an adjustment. If the difference is large enough, either the output of the comparator 218 or output of the differential comparator 220 will go to a logic one or high.

The sensitivity of the comparator 216 can be adjusted by varying the value of a variable resistor 310 connected between the inverting input of the amplifier 220 and the non-inverting input of the amplifier 218. The outputs of the comparators 218 and 220 are connected to the polarity detector 222. The polarity detector 222 controls the direction of the up/down zero counters in the calibrators as will be described in greater detail hereinafter. The polarity detector 222 is necessary because of the bipolar analog voltage coming from the preamplifiers 36. When zeroing with the negative voltage references the adjustment must be made in the opposite direction than when using the positive voltage references.

A NOR gate 244 goes to a logic 0 when the difference determined by the window comparator 216 is sufficient to make an adjustment, thereby allowing the 5-kilohertz clock 224 to operate through a NOR gate 246, up/down counters of the calibrating circuit which will be described in greater detail hereinafter. The 50-millisecond clock 110 activates the 5-kilohertz clock 224 by way of a lead line 248.

The 5-kilohertz clock 224 is activated through a latch 250 and a NOR gate 252. The latch comprises a pair of cross-coupled NOR gates 254 and 256. When the multiplexer 14 is no longer at its home position the latch 250 will trip when the 50-millisecond clock 110 goes high. The 5-kilohertz clock 224 does not start until the 50-millisecond clock 110 goes low. The time duration that the 50-millisecond clock 110 is high allows the analog signal appearing on the line 242 to settle and allows the window comparator 216 to make a decision. When the 5-kilohertz clock 224 is activated and one of the outputs of the comparators 218 and 220 is high, the 5-kilohertz clock 224 will drive the up/down counters of the calibrator circuit chosen by the multiplexer 14. During the time that the 50-millisecond clock 110 is low the up/down counters will count until the compensated input voltage appearing on the line 232 matches the reference voltage supplied along the lead line 240. When this match occurs both comparators 218 and 220 outputs will be low. No further compensation occurs due to the NOR gate 244. The NOR gate 244 also resets the latch 250 along a lead line 253 which in turn inhibits the 5-kilohertz clock 224. This same signal from the NOR gate 244 also makes the output of the NOR gate 246 go low, to further prevent the 5-kilohertz clock 224 from driving the up/down counters in the chosen calibrator circuit.

When the 50-millisecond clock 110 of the sequence controller 12 cycles again, the multiplexer 14 will step to the next position thereby chosing another calibration circuit to calibrate its corresponding measuring system and the comparator cycle starts again as described above.

If the 5-kilohertz clock 224 is still running when the 50-millisecond clock 110 again goes high, the NOR gate 252 will turn off the 5-kilohertz clock 224. The NOR gate 252 will turn the 5-kilohertz clock 224 on again when the 50-millisecond clock 110 goes low. This allows the comparator 16 to change state without affecting the up/down counters in the chosen comparator circuit.

After the multiplexer 14 has cycled or scanned through all the measuring systems the LC+2 signal from the multiplexer 14 along the line 128 tells the sequence controller 12 that the negative voltage calibration is complete and to thereafter stop the cycle, the sequence controller 12 applying a reset signal to the multiplexer 14 from the seventh latch 136 to reset the multiplexer 14 to its home position.

POSITIVE VOLTAGE CALIBRATION

The positive voltage calibration is similar to the negative voltage calibration except that two scans of the multiplexer 14 through all the calibrator circuits and measuring systems are required instead of one. Two reference signals are required, one of the reference signals being one-half the difference of the error between the second input signal from the pre-amplifier 36 and the upper bound, 5 volts.

When the sequence controller 212 is activated by the gauging machine 24 through PB4 hereby indicating that the transducers as exemplified by the transducer 26 is at the positive voltage references as exemplified by the positive voltage reference 22, a logic 1 or high will appear on the lead line 176 to cause the switch 214 to connect the adder-subtractor 212 to the buffer 238 and to the window comparator 216 through a line 266, the adder-subtractor 212 thereby becoming a positive zero reference. The adder-subtractor 212, includes three matching resistors 261, 263 and 265 as shown in FIG. 8a.

A sample and hold circuit 256 is provided to hold the compensated input signal appearing on the line 232 after being switched to its hold mode by the 50-millisecond clock 110 to thereby apply the compensated input signal to a buffer 258.

The plurality detector 222 is activated to reverse the counting of the up/down zero counters of the chosen calibrator circuit along a line 260, during the positive voltage calibration due to the change in polarity of the compensated input signal appearing on the line 232. A logic high is applied to the lead line 198 from the NAND gate 196 to cause the analog switch 214 to switch to the output of the buffer 234 along a lead line 262. This signal appearing on the lead line 262 is a non-inverted, compensated input signal and is connected to the window comparator 216 through the buffer 236. The output of the buffer 234 remains connected to the input of the buffer 236 until the complete calibration cycle is completed.

The multiplexer 14 steps from its home position to its first position (indicated by a signal along the lead line 262) and also indicated by an LED 263 in series with a resistor 265, a jumper 267 and an inverting amplifier 269 as shown in FIG. 9, upon receiving a pulse from the 50-millisecond clock 110. When the 50-millisecond clock 110 goes low the sample and hold circuit 256 switches to its hold mode thus retaining the compensated input voltage signal at said instant. As will be described in greater detail hereinafter, it is necessary to retain this voltage point in order to compensate for one-half of the error of the measuring system under calibration from the upper bound. If this voltage is not held the compensated input voltage signal would vary as the zero circuit is being adjusted thus losing the reference point.

The multiplexer 14 steps through the various measuring systems until the positive zero calibrating scan is completed. When the multiplexer 14 has stepped to its LC+1 position indicated on the line 126 the sequence controller 12 resets the multiplexer 14 to its zero or home position through the xeventh latch 136 and applies a logical zero or low signal along the lead line 176 to remove the positive zero reference voltage coming from line 266 through the switch 214 and reapplies the positive reference voltage (i.e. 5 volts) along the lead line 240 through the analog switch 214 and the buffer 238 to the window comparator 216.

When the multiplexer 14 steps to its first position again the gain circuits of the measuring systems begin to be sequentially calibrated. After the last gain circuit is calibrated the multiplexer 14 first outputs the LC+1 signal on the line 126 and then its LC+2 signal along the line 128 at which time the sequence controller 12 resets the multiplexer 14 to its zero position and the entire calibration cycle ends.

In essence the negative voltage calibration sequence is a single cycle containing one zero scan and the positive voltage calibration is a double cycle containing one zero and one gain scan, with zero polarity reversed from the negative voltage calibration sequence.

CALIBRATOR CIRCUIT

The calibration block 18 which includes a plurality of calibration circuits performs the actual zero and gain changes required. FIG. 2 shows a schematic form how each gain circuit 42 has associated with it an up/down counter and Digital to Analog circuits generally indicated at 270. Each zero circuit 48 has associated therewith an up/down zero counter and Digital to Analog circuits generally indicated at 272. The outputs of the pre-amplifier 36 and the zero circuit 48 are combined at a difference amplifier or subtraction circuit 54, the output of which is input to the gain circuit 42.

Each of the measuring systems has an overflow output to indicate when that measuring system has reached its maximum range. An indicator such as an LED 273 as shown in FIG. 9 will come on to identify which of the measuring systems has overflowed.

Only one of the measuring systems and only one of the calibration circuits will be described since the other 19 measuring systems and calibrating circuits operate in exactly the same fashion.

Referring to FIGS. 5 and 9, a raw analog input signal comes from a particular transducer preamplifier 36 along the line 44. The compensated output of the gain circuit 42 appears on the lead line 62 and is indicated by the meter or indicator 38. The compensated input signal appearing on the line 62 is connected to the line 232 by a switch 272 which is activated when the multiplexer 14 selects the particular measuring system to be calibrated shown along the line 262.

Each of the up/down counter and D to A circuits 270 and 272 includes an eight-bit binary counter 276 and 278, respectively. Each of these eight-bit counters 276 and 278 comprises two interconnected four-bit counters 280 and 282, and 284 and 286, respectively. The counters 276 and 278 are presettable. When the counters 276 and 278 have been reset or preset each of their outputs will be the binary number 1000 0000. Each of the circuits 270 and 272 includes a digital to analog converter circuit 288 and 290 respectively, which are set for bipolar operation. Therefore, when the outputs of the counters 276 and 278 equal 1000 0000 the equivalent analog output voltage of the P to A converters 288 and 290 will be zero. The counters 276 and 278 are preset when PB2 is actuated such that no zero offset or gain adjustment is applied to the raw analog signal appearing on the lead line 44. The zero D to A converter 288 is biased at 0.64 volts by a positive voltage reference 289 which includes a pair of biasing resistors 291 and 293.

The zero counter 276 can count from 0 to 255 with the binary number 1000 0000 equaling a count of 128. A typical example would mean that one bit would equal 5 millivolts thereby allowing the zero to range from plus to minus 0.64 volts DC. Also as a typical example, the gain represented by the gain counter 278 could be between 0.9 and 1.1. Any value of voltage may be used to represent one bit of the zero and gain counters. For larger steps (i.e. a larger voltage per bit) more range will be available at the sacrifice of resolution. Likewise, smaller steps would increase resolution but would limit the range.

If the window comparator 216 determines that an adjustment in the zero circuit is to be made, the counter 276 will be set in either the up or down count mode depending on the polarity of the adjusted input signal appearing on the line 232. When the clock pulses appearing on the line 292 begin, the zero counter 276 will change its output count accordingly. As a result, the zero D to A converter 288 will change its analog output which drives the amplifier 48 from zero voltage output. In turn, the amplifier 48 applies a voltage to the difference comparator 54 which voltage is combined with the voltage on the line 44, the comparator outputting a compensated signal along the lead line 59 which in turn is amplified by the gain circuit 42 to obtain a compensated input signal.

The compensated input signal which appears on the lead lines 62 and 232 is connected to the window comparator 216 as previously described. The compensated input signal appearing on lead lines 62 and 232 will continue to change as long as the window comparator 216 does not balance. When the comparator 216 does balance the clock pulses from the 5-kilohertz clock 224 appearing on the lead line 292 will stop thereby stopping the counter 276. As a result the zero voltage appearing on the lead line 60 will also stop changing. When a gain change is required the same sequence occurs except the gain counter 278 and the gain digital-to-analog converter 290 are used.

The signal appearing on the lead line 58 is multiplied by a gain factor set by the D to A converter 290. The gain amplifier 47 outputs this multiplied signal into the lead line 62 in the form of a compensated input signal.

When either one of the up/down counters 276 and 278 reach their maximum count a NOR gate 292 is activated through a pair of NOR gates 295 and 297 and turns on a latch circuit 294 which comprises a pair of cross-coupled NAND gates 296 and 298. The latch circuit 294 is reset along a lead line 300 on which line 300 a preset enable signal presets the up/down counters 276 and 278 through a NAND gate 302. By presetting the counters 276 and 278 to the binary number 1000 0000 all gain and zero compensation is removed from the selected measuring system to allow the indicator 38 to display the true condition of the preamplifier 36.

The latch circuit 294 also turns on a driver amplifier 304 to energize an indicator LED 272 along the line 306 to indicate when either one of the counters 276 or 278 is in an overflow condition. This portion of the calibration circuit 18 will not function again until it has been reset by PB2 along the line 300.

OPERATION

After the timer 68 times out indicating that a new calibration cycle should begin the transistor Q1 indicates to the gauging machine 24 that a new gauging cycle is not to begin after the present gauging cycle is completed. After the present gauging cycle is completed PB1 is automatically actuated to energize transistor Q2 to move the transducers to their corresponding negative voltage references via the servo system 40. When this movement is completed PB3 is automatically actuated and after a slight time delay introduced by the first delay circuit 70 the 50-millisecond clock 110 begins to operate the multiplexer 14 to begin scanning the 20 measuring systems beginning with the first measuring system. The first raw analog input signal from chosen transducer's preamplifier 36 is not immediately affected by the D to A converters 288 and 290 which are controlled by the counters 276 and 278. A first compensated input signal is carried along a lead line 232 through an activated switch 272 and to the gain inverter 227 to be compared with the first fixed reference signal (+5 volts) along the line 240. As long as the difference between the first compensated input signal and the first fixed reference signal is greater than approximately 20 millivolts as determined by a hysteresis resistor 310, the 5-kilohertz clock 224 will cause the zero counter 276 to count up or down via line 292 and the NAND gate 312. The multiplexer 14 then steps or scans to a second measuring system and so on allowing 50-milliseconds time period for the calibration of each negative zero calibration.

After the multiplexer 14 has completed its first scan cycle, the multiplexer 14 indicates to the controller 12 along lead line 126 and 128 that the negative zero scan is complete. The sequence controller 12 then sends a control signal via transistor Q3 to the servo system of the gauging machine 24 to move the transducers to the positive voltage references. After this movement is complete the gauging machine 24 automatically signals to the sequence controller 12 through PB4 that the movement is completed. After a delay introduced by the second delay circuit 72 the 50-millisecond clock 110 again causes the multiplexer 14 to begin its scan of the 20 measuring systems. A raw analog positive input voltage then appears on the line 44 and the gain circuit 42 outputs a third compensated input signal on the lead line 62 which is sampled by the sample-and-hold circuit 256 and held. This held voltage signal is added to the positive voltage reference signal (5+ volts) appearing on the line 240 through a pair of matched summing resistors 314 and 315. This added value appears on a line 316 which value is divided by two by the analog adder-subtractor 212 to obtain a positive zero reference signal on the line 266. This variable reference signal appearing on the line 266 is compared with the third compensated input signal at the window comparator 216, the polarity detector 222 causing the zero counter 276 to count in the opposite direction until the difference between the third compensated input signal and the variable reference signal has been substantially eliminated. In the same fashion, the multiplexer 14 spends 50 milliseconds with each measuring system until signaling the sequence controller 12 that its scan has been completed (by outputting the signals LC+1 and LC+2 on the lines 126 and 128). A fourth compensated input signal on the lead line 62 is compared with the fixed reference signal (+5 volts) appearing on the line 240 which represents the upper bound of the range of the indicator 38. The analog switch 214 provides or allows the line 240 to be connected to the buffer 238 and disconnects the line 266 from the buffer 238. As before the window comparator 216 compares the fourth reference signal and either allows the 5-kilohertz clock to clock the gain counter 278 upwardly or downwardly depending whether the fourth compensated input signal is greater or less than the fixed reference signal corresponding to the upper bound. When this difference is no longer substantial, as determined by the hysteresis resistor 310, the NOR gate 246 no longer allows the 5-kilohertz clock 224 to clock the gain counter 278. Again, in the same fashion, the multiplexer 14 scans through the remainder of the measuring system to adjust their corresponding gain counters in 50-millisecond intervals.

After the scanning process is completed as indicated on the lines 126 and 128, the timer 68 is reset and control is transferred from the sequence controller 12 to the gauging machine 24 which may perform its gauging function.

The invention has been described in an illustrative manner, and it is to be understood that the terminology which has been used is intended to be in the nature of words of description, rather than of limitation.

Many modifications and variations of the present invention are possible in light of the above teachings. It is, therefore, to be understood that the invention may be practiced otherwise than as specifically described.

What is claimed is:

1. A calibration system for calibrating an electrical measuring system, of the type having a gain circuit, a zero circuit and a combination circuit to obtain compensated electrical input signals, the measuring system producing an electrical measurement in a predetermined range defined by upper and lower bounds of opposite polarity, said calibration system comprising:

first and second reference means for providing first and second references corresponding to the lower and upper bounds, respectively, of the predetermined range of the measuring system when calibrated, the uncalibrated measuring system providing first and second electrical input signals of opposite polarity upon measuring said first and second references, respectively, third reference means for providing reference signals, comparator means for comparing reference signals to corresponding compensated input signals, and outputting corresponding adjustment signals corresponding to the difference therebetween, zero adjustment means for adjusting the zero circuit in response to a first adjustment signal, wherein the electrical measuring system outputs a compensated input signal corresponding to the lower bound, and gain adjustment means for adjusting the gain circuit in response to a second adjustment signal wherein the electrical measuring system outputs a compensated input signal corresponding to the upper bound.

2. The calibration system as claimed in claim 1 wherein said calibration system includes a polarity detector means for detecting the polarity of said input signals to characterize said adjustment signals, said zero adjustment means being responsive to said polarity detector means.

3. A calibration system for automatically calibrating an electrical measuring system of a gauging machine, the measuring system of the type having a gain circuit, a zero circuit and a combination circuit to obtain compensated electrical input signals, the measuring system producing an electrical measurement in a predetermined range defined by upper and lower bounds, said calibration system comprising:

first and second reference means for providing first and second references corresponding to the lower and upper bounds, respectively, of the predetermined range of the measuring system when calibrated, the uncalibrated measuring system providing first and second electrical input signals upon measuring said first and second reference means, respectively, wherein the gauging machine includes drive means for positioning the measuring device and the first reference means in operative relationship to obtain the first input signal and for positioning the second reference means and the measuring device in operative relationship to obtain the second input signal, control means for controlling the gauging machine, wherein said control means controls the drive means and is responsive to signals from the gauging machine indicating said operative relationship to control the calibration process, third reference means for providing reference signals, comparator means responsive to said control means for comparing reference signals to corresponding compensated input signals and outputting corresponding adjustment signals corresponding to the differences therebetween, zero adjustment means responsive to said control means for adjusting the zero circuit in response to a first adjustment signal wherein the electrical measuring system outputs a compensated input signal corresponding to the lower bound, and gain adjustment means responsive to said control means for adjusting the gain circuit in response to a second adjustment signal wherein the electrical measuring system outputs a compensated input signal corresponding to the upper bound.

4. The system as claimed in claim 3 wherein the upper and lower bounds are of opposite polarity and said corresponding input signals are of opposite polarity and wherein said calibration system includes a polarity detector means for detecting the polarity of said input signals to characterize said adjustment signals, said zero adjustment means being responsive to said polarity detector means.

5. The system as claimed in claim 3 or claim 4 wherein said control means includes a resetable timer means for initiating said calibrating process at predetermined timed intervals, said timer means being reset when said calibrating process is completed.

6. A calibration system for automatically calibrating a plurality of electrical measuring systems of a gauging machine in sequence, each measuring system of the type having a gain circuit, a zero circuit and a combination circuit to obtain compensated electrical input signals, each of the measuring systems producing an electrical measurement in a predetermined range defined by upper and lower bounds, said calibration system comprising:

first and second reference means for providing first and second references corresponding to the lower and upper bounds, respectively, of the predetermined range of the measuring systems when calibrated, the uncalibrated measuring systems providing a plurality of first and second electrical input signals upon measuring said first and second reference means, respectively, the gauging machine including a drive means for positioning the measuring devices and the first reference means in operative relationship to obtain the first input signals and for positioning the second reference means and the measuring devices in operative relationship to obtain the second input signals, control means for controlling the gauging machine, wherein said control means controls the drive means and is responsive to signals from the gauging machine indicating said operative relationships to control the calibrating process, scanning means responsive to said control means for scanning the measuring systems to allow said control means to sequentially control the calibration process of each electrical measuring system, and calibrating means responsive to said controller, said first and second input signals and said scanning means for sequentially adjusting said zero circuits and said gain circuits wherein the electrical measuring systems output compensated input signals corresponding to the lower bound and the upper bound in response to said first and second input signals, respectively.

7. The system as claimed in claim 6 wherein said calibrating means includes comparator means for comparing reference signals to corresponding compensated input signals and outputting corresponding adjustment signals corresponding to their respective difference therebetween.

8. The system as claimed in claim 7 wherein said calibrating means includes adjusting means for adjusting the zero and gain circuits in response to corresponding adjustment signals.

9. The system as claimed in claim 8 wherein said adjusting means includes zero adjusting means for adjusting the zero circuits in response to a plurality of first adjustment signals wherein the electrical measuring systems output compensated input signals corresponding to the lower bound.

10. The system as claimed in claim 9 wherein said adjusting means includes gain adjusting means for adjusting the gain of the gain circuits in response to a plurality of second adjustment signals wherein the electrical measuring systems output a corresponding plurality of compensated input signals corresponding to the upper bound.

11. The system as claimed in claim 10 wherein the upper and lower bounds and said corresponding input signals are of opposite polarity and wherein said calibration system includes a polarity detector means for detecting the polarity of said input signals to characterize said adjustment signals, said zero adjustment means being responsive to said polarity detector means.

12. The system as claimed in claim 11 wherein said control means includes a resettable timer means for initiating said calibrating process at predetermined timed intervals, said timer means being reset when said calibrating process is completed.

13. A calibration system for automatically calibrating a plurality of electrical measuring systems of a gauging machine in sequence, each measuring system of the type having a gain circuit, a zero circuit and a combination circuit to obtain compensated electrical input signals, each of the measuring systems producing an electrical measurement in a predetermined range defined by upper and lower bounds, said calibration system comprising:
 first and second reference means for providing first and second references corresponding to the lower and upper bounds, respectively, of the predetermined range of the measuring system when calibrated, the uncalibrated measuring systems providing a plurality of first and second electrical input signals upon measuring said first and second reference means, respectively, the gauging machine including a drive means for positioning the measuring devices and the first reference means in operative relationship to obtain the first input signals and for positioning the second reference means and the measuring devices in operative relationship to obtain the second input signals,
 third reference means for providing fixed and variable reference signals,
 comparator means for comparing reference signals to corresponding compensated input signals and outputting corresponding adjustment signals corresponding to the differences therebetween,
 zero adjustment means for adjusting the zero circuits in response to a plurality of first adjustment signals wherein the electrical measuring systems output a corresponding plurality of compensated input signals corresponding to the lower bound;
 control means for controlling the gauging machine, wherein said control means controls the drive means and is responsive to signals from the gauging machine indicating said operative relationships to control the calibration process;
 scanning means responsive to said control means for scanning the measuring systems to allow said control means to sequentially control the calibration process of each measuring system;
 gain adjustment means for adjusting the gain of the gain circuits in response to a plurality of second adjustment signals wherein the electrical measuring systems output a corresponding plurality of compensated input signals corresponding to the upper bound.

14. The system as claimed in claim 13 wherein said control means includes a resettable timer means for initiating said calibration process at predetermined timed intervals, said timer means being reset when said calibrating process is completed.

15. The system as claimed in claim 13 or claim 14 wherein the upper and lower bounds are of opposite polarity and said corresponding input signals are of opposite polarity and wherein said calibration system includes a polarity detector means for detecting the polarity of said input signals to characterize said adjustment signals, said zero adjustment means being responsive to said polarity detector means.

16. The system as claimed in claim 15 wherein said third reference means includes switching means for switching one of a fixed reference signal and a variable reference signal to said comparator means.

17. A calibration system for calibrating an electrical measuring system, of the type having a gain circuit, a zero circuit and a combination circuit to obtain compensated electrical input signals, the measuring system producing an electrical measurement in a predetermined range defined by upper and lower bounds, said calibration system comprising:
 first and second reference means for providing first and second references corresponding to the lower and upper bounds, respectively, of the predetermined range of the measuring system when calibrated, the uncalibrated measuring system providing first and second electrical input signals upon measuring said first and second references, respectively,
 third reference means for providing fixed and variable reference signals,
 comparator means for comparing reference signals to corresponding compensated input signals, and outputting corresponding adjustment signals corresponding to the difference therebetween, the comparator means comparing a fixed reference signal corresponding to said lower bound with the first input signal and outputting a first adjustment signal corresponding to the difference therebetween,
 zero adjustment means for adjusting the zero circuit in response to selected adjustment signals including said first adjustment signal wherein the electrical measuring system outputs a second compensated input signal corresponding to the lower bound, said third reference signal corresponding to a third compensated input signal defined by the combined second input signal and a signal from the adjusted zero circuit, said comparator means comparing said variable reference signal with the third compensated input signal and outputting a second adjustment signal corresponding to the difference therebetween, said zero adjustment means readjusting the zero circuit in response to said second adjustment signal wherein the electrical measuring system outputs a fourth compensated input signal; said comparator means comparing said fourth compensated input signal with a fixed reference signal corresponding to said upper bound and outputting a third adjustment signal corresponding to the difference therebetween, and gain adjustment means for adjusting the gain circuit in response to said third adjustment signal wherein the electrical measuring system outputs a fifth compensated input signal corresponding to the upper bound.

18. The system as claimed in claim 17 wherein the upper and lower bounds are of opposite polarity and said corresponding input signals are of opposite polarity and wherein said calibration system includes a polarity detector means for detecting the polarity of said input signals to characterize said adjustment signals, said zero adjustment means being responsive to said polarity detector means.

19. The system as claimed in claim 17 or claim 18 wherein said third reference means includes a variable reference means for providing the variable reference signal, said variable reference signal corresponding to one-half the algebric sum of said fixed reference signal corresponding to the upper bound and said third compensated input signal and wherein both of said fixed reference signals are equal in magnitude, said upper and lower bounds being equal in magnitude and opposite in polarity.

20. A method for calibrating an electrical measuring system of the type having a gain circuit for amplifying electrical input signals, a zero circuit and a combination circuit to obtain compensated electrical input signals, the measuring system producing an electrical measurement in a predetermined range defined by upper and lower bounds of opposite polarity, said method comprising the steps of:

sensing first and second references corresponding to the upper and lower bounds, respectively, to provide first and second electrical input signals, respectively, of opposite polarity to the electrical measuring system, comparing reference signals corresponding to the lower and upper bounds with the corresponding compensated electrical input signals corresponding to the first and second references, respectively, to generate corresponding first and second adjusted signals corresponding to the differences therebetween, and adjusting the zero and gain circuits in response to the first and second adjusted signals, respectively, wherein the electrical measuring system outputs compensated input signals corresponding to the lower and upper bounds, respectively.

21. Method as claimed in claim 20 wherein the sensing step includes the step of positioning a measuring device in operative relationship with the first and second references.

22. A method for calibrating a plurality of electrical measuring systems, each measuring system of the type having a gain circuit for amplifying electrical input signals, a zero circuit and a combination circuit to obtain compensated electrical input signals, each of the measuring systems producing an electrical measurement in a predetermined range defined by upper and lower bounds, said method comprising the steps of:

positioning the measuring devices in operative relationship with a first reference means corresponding to the lower bound, sensing the first reference means to provide a plurality of first electrical input signals to the electrical measuring systems, comparing a first reference signal corresponding to the lower bound with a first plurality of compensated electrical input signals to generate a corresponding plurality of first adjusted signals, corresponding to the differences therebetween, adjusting the corresponding zero circuits in response to the first plurality of adjusted signals wherein the electrical measuring systems output a second plurality of compensated input signals corresponding to the lower bound, positioning the measuring devices in operative relationship with a second reference means corresponding to the upper bound, sensing the second reference means to provide a second plurality of electrical input signals to the electrical measuring systems, comparing a second reference signal corresponding to the upper bound with compensated electrical input signals corresponding to the second reference means to generate a corresponding plurality of second adjusted signals corresponding to the differences therebetween, and adjusting the gain circuits in response to the second plurality of adjusted signals wherein the electrical measuring systems output compensated input signals corresponding to the upper bound.

* * * * *

UNITED STATES PATENT AND TRADEMARK OFFICE
CERTIFICATE OF CORRECTION

PATENT NO. : 4,263,803
DATED : April 28, 1981
INVENTOR(S) : Allan D. Burkhardt

It is certified that error appears in the above—identified patent and that said Letters Patent is hereby corrected as shown below:

Column 1, line 31, "voltage" should be --voltages--.

Column 4, line 26, after the word "which" and before the word "for" --is shown-- should be inserted.

Column 4, line 65, "voltge" should be --voltage--.

Signed and Sealed this

Twenty-fifth Day of August 1981

[SEAL]

Attest:

Attesting Officer

GERALD J. MOSSINGHOFF

Commissioner of Patents and Trademarks